United States Patent

[11] 3,581,531

| [72] | Inventor | Richard L. Hediger<br>P. O. Box 1051, Springfield, Oreg. 97477 |
|---|---|---|
| [21] | Appl. No. | 841,402 |
| [22] | Filed | July 14, 1969 |
| [45] | Patented | June 1, 1971 |

[54] LOCKING DEVICE FOR A MOTORCYCLE HELMET
3 Claims, 2 Drawing Figs.

[52] U.S. Cl. .................................................. 70/59
[51] Int. Cl. ............................................. E05b 73/00
[50] Field of Search ................................. 70/14, 15, 30, 37, 49, 58, 59, 61, 62, 203; 292/148, 205, 264, 282, 284, 340; 211/4, 5, 18; 248/203

[56] References Cited
UNITED STATES PATENTS

| 1,274,203 | 7/1918 | Sager ........................ | 211/4 |
| 2,358,914 | 9/1944 | Dray ........................... | 292/148 |
| 2,554,759 | 5/1951 | Vickers ...................... | 292/264 |
| 3,436,936 | 4/1969 | Locker ....................... | 70/59 |

FOREIGN PATENTS

| 367,725 | 4/1963 | Switzerland ................. | 70/49 |

Primary Examiner—James A. Leppink
Assistant Examiner—Edward J. McCarthy
Attorney—James D. Givnan, Jr.

ABSTRACT: A locking device for securing articles such as safety helmets to motorcycles and including a plate mounted on the motorcycle structure and an insert member stowable in the plate and, in use, insertable through the article being locked. The insert member receives the shackle of a padlock to prevent the member from being separated from the helmet to lock the latter to the motorcycle structure. The insert member is permanently attached to the plate by a flexible member.

PATENTED JUN 1 1971
3,581,531
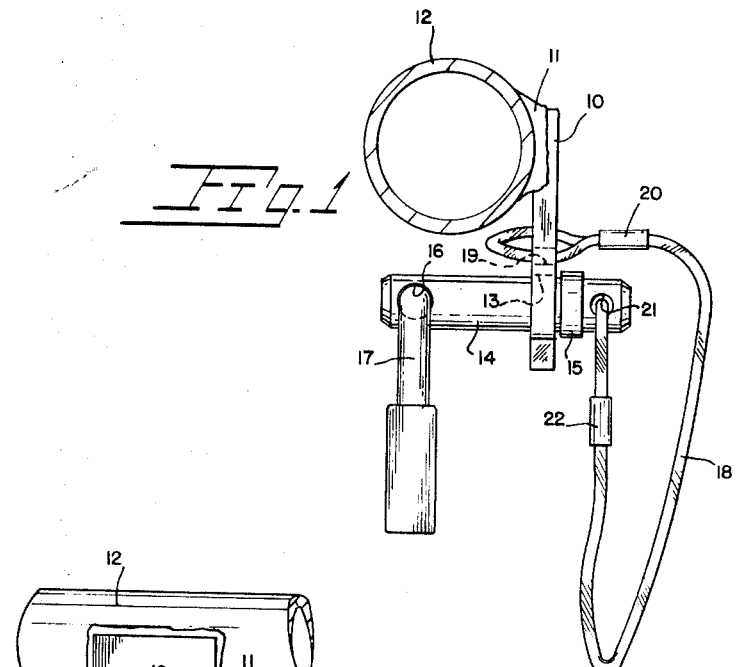
Fig.1
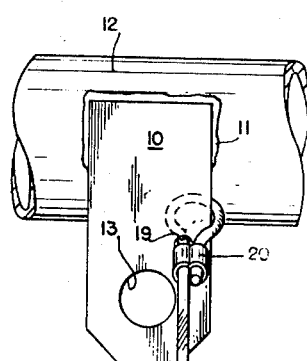
Fig.2
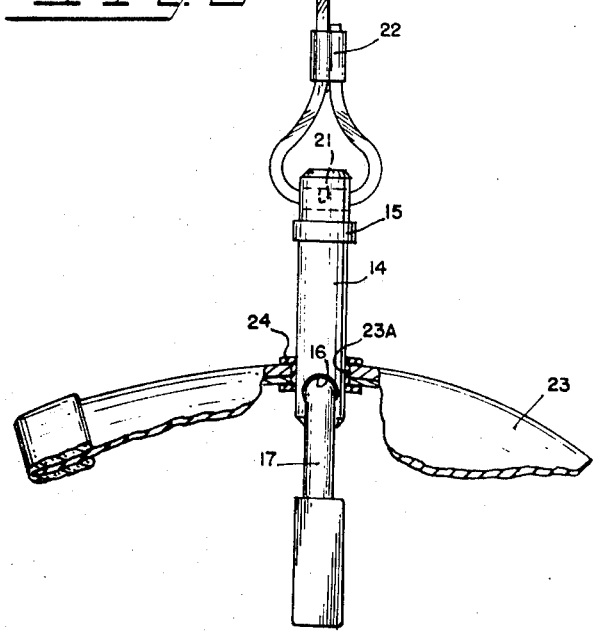
RICHARD L. HEDIGER
INVENTOR.
BY 
AGENT

3,581,531

LOCKING DEVICE FOR A MOTORCYCLE HELMET

BACKGROUND OF THE INVENTION

The present invention relates generally to locking devices and more particularly to a device for lockably attaching a helmet to a motorcycle.

It is common now for safety helmets to be required under law for operators of motorcycles and similar-type two-wheeled vehicles. This has resulted in a considerable inconvenience to the operator particularly when the motorcycle is parked in a public parking area. To leave the helmet with the vehicle invites theft of the helmet while manually carrying of the helmet on the person is particularly inconvenient. The cost of helmets coupled with the probability of theft is such that for practical purposes the helmet is never left with the motorcycle in public parking areas.

To remedy this situation a simple, inexpensive locking device as herein disclosed is provided. The device advantageously incorporates standard components which in their novel arrangement contribute to a highly useful and practical helmet lock. The present invention is useable with any type of safety helmet and requires but a single small aperture to be formed therein. The aperture does not affect the helmet's structural integrity to any appreciable extent.

SUMMARY OF THE INVENTION

The instant invention pertains to locking devices particularly suited for securing safety helmets to parked motorcycles.

Important to achieving its ends the invention embodies an insert member secured to the motorcycle and insertable through the helmet. A lock is positionable through the member to prevent its separation from the helmet and accordingly secures the helmet to the motorcycle. A mounting plate serves to conveniently retain the insert member and padlock in a stowed position when not is use. A length of flexible cable interconnects the inert member with the mounting plate.

An important object of the invention is to provide a means for securing a helmet to the chassis or other structure of a motorcycle to prevent theft of the helmet. The heretofore inconvenient carrying a helmet on the person, when the motorcycle is left parked in a public area is avoided.

A further object is the provision of a locking device utilizing a standard mass-produced padlock or equivalent component to effect a locking device of extremely low-cost, desirable and reliable characteristics. Further the locking device is useable in securing various articles lending themselves to mounting of the present locking device.

DRAWING DESCRIPTION

In the accompanying drawings:
FIG. 1 is a side elevational view of the present locking device in a stowed or unused position,
FIG. 2 is a front elevational view of the invention operatively disposed securing a helmet to a motorcycle chassis structure.

DESCRIPTION OF PREFERRED EMBODIMENT

With continuing reference to the accompanying drawings wherein reference numerals identify parts similarly identified in the following specification, the reference numeral 10 indicates a mounting plate permanently affixed, as by a weld 11 to a part 12 of a vehicle structure. While a handlebar is shown in section at 12 it will be apparent that plate 10 may be attached in other satisfactory locations and to various structures.

Plate 10 is of a size to permit convenient depending attachment to a handlebar to avoid being a hazardous projection. The lower portion of the plate is apertured at 13 to receive an insert member 14 of slightly less diameter. A collar 15 is formed integrally at one end of the member to limit its movement while at the opposite end of the member an opening 16 is provided for the reception of the shackle portion 17 of a conventional padlock.

Permanently attaching the insert member 14 to the mounting plate 10 is a length of flexible wire cable 18 of the type not susceptible to cutting. Aircraft control cable stock has been found desirable for such use.

Adjacent aperture 13 is a second opening 19, of lesser diameter, through which passes an end portion of cable 18 which is looped back on itself and secured by a clip 20. It is believed obvious that the manner of permanent attachment of the cable 18 to the plate 10 may be varied within the present invention. The opposite end of cable 18 is directed through an opening 21 in insert member 14 and in similarity to the foregoing clipped back to itself at 22.

In FIG. 2, I show the locking device operatively disposed with the cable 18 with the insert member passing through an opening 23A in a helmet 23. The opening in the helmet shell is preferably located as to cause the helmet to be suspended in a manner to cause the head opening therein to be disposed downwardly in case of inclement weather. A grommet 24 may be affixed to the helmet to effect snug engagement with the insert member.

The locking device is stowed as shown in FIG. 1 when the helmet is being worn, the padlock shackle 17 functioning to retain the insert member 14 in the plate 10. Correspondingly, an extremely convenient arrangement is thereby provided in that the plate-insertable member 14 functions as a holder for the padlock when same is not in use. Opening of the padlock and removal of the shackle from the opening 16 allows removal of the insert member and inserted engagement thereof with the opening 23A of the helmet.

The use of the lock is believed readily apparent from the foregoing.

Having thus described the invention what I claim to secure under a Letters Patent is:

1. A locking device for securing a motorcycle helmet to a motorcycle, said device comprising in combination,
   a mounting plate for permanent securement to a part of the motorcycle with said plate having an aperture formed therein,
   an elongate cylindrical insert member for partial insertion through a correspondingly sized opening within the shell of the motorcycle helmet, said member having an opening extending transversely therethrough adjacent the helmet inserted end to receive the shackle of a padlock with the shackle of the padlock preventing helmet removal,
   a flexible member extending intermediate the other end of the insert member and the mounting plate to permanently attach the insert member to the mounting plate, and
   said insert member further adapted when not used for securing the motorcycle helmet to the motorcycle for insertion through the aperture in the mounting plate with the apertured end of the insert thence serving to support the reapplied padlock.

2. The locking device as claimed in claim 1 wherein said insert member is provided with a collar disposed intermediate the ends of the insert to limit axial movement of the member into said mounting plate and the helmet.

3. The locking device as claimed in claim 2 wherein said flexible member is a length of woven cable looped adjacent its ends through said insert member and said mounting plate with said ends secured back on themselves by applied clips.